United States Patent Office 3,167,472
Patented Jan. 26, 1965

3,167,472
PESTICIDAL 3-METHYL-5-ISOPROPYL PHENOL ESTERS OF N-MONO- AND N-DIMETHYLCARBAMIC ACID
Alfred Czyzewski, Berlin-Tempelhof, and Albert Jager, Berlin-Hermsdorf, Germany, assignors to Schering, A.G., Berlin, Germany
No Drawing. Filed May 2, 1961, Ser. No. 107,019
Claims priority, application Germany, May 7, 1960, Sch 27,928
12 Claims. (Cl. 167—30)

This invention relates to novel esters of carbamic acid derivatives, and is particularly concerned with insecticidal and acaricidal compositions containing the novel carbamic acid derivatives, methods for the preparation of the derivatives, and methods of protecting plants and other objects from insects and mites by means of the novel carbamic acid esters.

We have found that compounds of the general formula

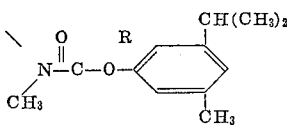

wherein R is methyl or hydrogen have excellent pesticidal properties.

The compounds of the invention which are 3-methyl-5-isopropylphenol esters of N-mono- and N-dimethylcarbamic acid may be prepared from 3-methyl-5-isopropylphenol or the corresponding alkali metal phenolate, such as the sodium phenolate, by reaction with an excess of phosgene, preferably in an inert solvent such as benzene, toluene, or xylene, to form the 3-methyl-5-isopropylphenol ester of chloroformic acid, and reacting said chloroformic acid ester with an amine selected from the group consisting of methylamine and dimethylamine to form the corresponding carbamic acid ester, as described in Example XVII for the preparation of 3-methyl-5-isopropylphenyl-ester of N-methylcarbamic acid. The phenol is practically completely converted to the chloroformic acid ester which may be further reacted with equivalent amounts of methylamine or dimethylamine to form the desired carbamic acid ester.

The sequence of reactions is represented by the following formulas:

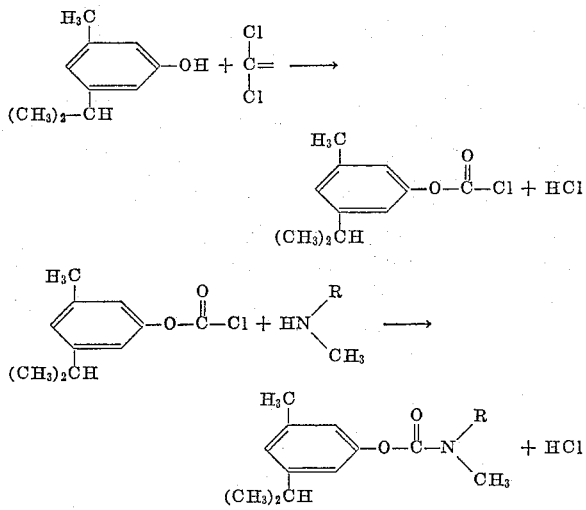

We prefer to perform the reaction between the 3-methyl-5-isopropylphenol and phosgene in the presence of an amount of an acid binding compound, such as pyridine, N,N-dimethylaniline, NaOH, $Na_2CO_3$, $NaHCO_3$, etc. in an amount sufficient to absorb the hydrogen chloride liberated.

Another sequence of reactions which leads to the carbamic acid derivatives of the invention involves the reaction of N-methyl- and N-dimethylcarbamoyl chloride with 3-methyl-5-isopropylphenol or its salts. The yield is improved by the presence of an acid binding compound.

One of the compounds may also be prepared by reacting methylisocyanate with 3-methyl-5-isopropylphenol.

Regardless of the method by which it is prepared, N-methylcarbamic acid 3-methyl-5-isopropylphenyl ester has a melting point of 87.5° C. The N-dimethylcarbamic acid ester of 3-methyl-5-isopropylphenol is characterized by a boiling point of 107° C. at 0.01 mm. Hg.

The toxicity of both compounds for warm-blooded animals is low.

The compounds of the invention have specific pesticidal effects on insects and on mites such as spider mites while lacking phytotoxic activity in useful pesticidal concentrations and amounts. They are particularly distinguished by strong initial action. They are compatible with conventional acaricides or miticides, fungicides, insecticides, and the commonly employed adjuvants. Their broad spectrum of pesticidal activity combined with very low phytotoxic activity makes the novel compounds of the invention effective and safe under difficult conditions of application.

We have further found that the compounds of the invention may advantageously be applied in mixtures containing other pesticides, such as insecticides and acaricides, and that such mixtures have pesticidal effects greater than the sum of the pesticidal effects of the components. Several classes of known pesticides show particularly good synergistic effects when combined with the carbamic acid derivatives of the invention.

Among the insecticides of the phosphoric acid ester type we prefer to mix the novel compounds with one or several of the following compounds:

O,O-dimethyl-S-(N-methylcarbamoylmethyl)dithiophosphate
O,O-dimethyl-S-(1,2-dicarbethoxyethyl)dithiophosphate
O,O-diethyl-O-(2-isopropyl-4-methylpyrimidyl-6)-thiophosphate
O,O-dimethyl-O-(p-nitrophenyl)-thiophosphate
O,O-dimethyl-O-(1-hydroxy-2,2,2-trichloroethyl)-phosphate Many of the known pesticides which are chlorinated hydrocarbon compounds are well suited to be combined with the carbamic acid derivatives of our invention, and the following examples are merely illustrative of such chlorinated hydrocarbon compounds:

1,1,1-trichloro-2,2-bis(p-chlorophenyl)-ethane;
1,2,3,4,10,10-hexachloro-1,4,4a,5,8,8a-hexahydro-1,4-endo,exo-5,8-dimethano-naphthalene;
1,2,3,4,10,10-hexachloro-6,7-epoxy-1,4,4a,5,6,7,8,8a-octahydro-1,4-endo,exo-5,8-dimethano-naphthalene;
1,2,3,4,10,10-hexachloro-6,7-epoxy-1,4,4a,5,6,7,8,8a-octahydro-1,4-endo,endo-5,8-dimethano-naphthalene.

Other pesticides from the carbamate class are also synergistically strengthened by mixing with the carbamic acid compounds of our invention, and 1-naphthyl-N-methylcarbamate is representative of this class.

Acaricides or miticides which cooperate with the pesticidal carbamic acid derivatives of this invention include the phosphoric acid esters enumerated above, as well as p-chlorophenyl-p-chloro-benzylsulfonate; 1,1-bis(chlorophenyl) trichloroethanol, p-chlorophenyl-p-chlorobenzyl sulfide; 2,4,4′,5-tetrachlorodiphenyl-sulfone, and others.

Depending on the method of application, the compounds of the invention are formulated as sprayable liquids, dusting compositions, fogging mixtures, coatings, fumigants or the like. The compositions may constitute aerosols, granulated solids, concentrates capable of instantaneous formation of emulsions upon mixing with water or other liquids, and the like. Inert solid carriers, organic solvents and other adjuvants such as wetting agents, fillers, emulsifiers, suspending agents, specific attractants and repellants or propelling gases may be mixed with the compounds of the invention to produce pesticidal compositions.

The 3-methyl-5-isopropylphenol esters of N-methyl- and N-dimethylcarbamic acid are soluble in chlorinated hydrocarbons, hydrogenated naphthalene derivatives such as dekahydro- and tetrahydronaphthalene, in ketones such as hexanone, in dimethylsulfoxide, cyclohexanol, kerosene, aliphatic and aromatic alcohols, solvent naphtha and technical mixtures of benzol homologs, xylol, phthalic acid esters such as the octyl ester, alkyl glycols, alkylcyclohexanols, and others, and may be employed dissolved in such solvents.

Aqueous and other emulsions of the carbamic acid derivatives of this invention may be prepared with conventional emulsifying agents. These agents may be of the non-ionic type, such as alkoxylated alkylphenols, fatty acid polyglycol esters and ethers, or derivatives of sorbitol. The non-ionic agents may be mixed with each other or with anionic surfactants, such as alkylaryl sulfonates or alkylaryl-polyglycol ethersulfonates.

Suitable inert solid carriers include quartz sand, talcum, aluminum silicates such as "Attapulgite," diatomaceous earth, bentonite, infusorial earth, pyrophyllite, etc.

The concentration of the active pesticidal agents of the invention in pesticidal compositions may be varied within wide limits which are determined by many factors, well understood among those skilled in the art. The determining factors include the type and population of the parasites to be attacked, the method of preparing and applying the composition, the result desired, and others. For most applications in agriculture the amount of active agent should be not less than 100 grams per hectare, and no further improvement is usually obtainable by applying more than 5000 grams per hectare. The concentration of the active agent in the composition should generally not be lower than 0.001%. It will be readily appreciated that optimum amounts to be applied will vary with actual conditions, and that it may be advisable to select amounts or concentrations of the active compounds of the invention which are outside the usual limits, where special conditions warrant.

Where the carbamic acid derivatives of the invention are mixed with other active pesticidal agents, best results will usually be obtained with compositions in which the ratio of the novel compounds of the invention to the other pesticides is within the limits of 1:10 and 10:1.

The specific pesticidal activity of the novel compounds of the invention will be apparent from the following examples of their application in comparison with compounds of similar chemical structure, and in comparison with well-known pesticides. Unless otherwise specifically stated, the pesticidal compounds are employed in the examples as aqueous dispersions or emulsions. The dispersions are prepared from dry compositions containing 20 percent of active agent and 80 percent of a carrier consisting of equal parts of kaolin and dextrin. The emulsions are prepared by diluting concentrates of the following formulation:

| | Percent |
|---|---|
| Active agent | 20 |
| Dimethylsulfoxide | 35 |
| Tetraline | 25 |
| Emulsifying agent (ethoxylated nonyl phenol) | 20 |

The following compounds used in the examples will be referred to hereinafter for the sake of brevity by the numbers assigned to them in Table 1.

Table 1

| No. | Compound |
|---|---|
| I | 3-methyl - 5 - isopropylphenyl N - methylcarbamate |
| II | 3-methyl - 5 - isopropylphenyl N - N-dimethylcarbamate |
| III | 3-methyl - 6 - isopropylphenyl N-methylcarbamate |
| IV | 2-methylphenyl N-methylcarbamate |
| V | 2-methylphenyl N, N-dimethylcarbamate |
| VI | 1-naphthyl N-methylcarbamate |

EXAMPLE I

*Musca domestica* L.—Common house fly

Aqueous emulsions of the compounds tested are applied to glass plates in such a manner as to deposit 0.05 mg. per 100 square centimeters. After drying of the liquid, upright open glass cylinders are covered with the treated plates. Twenty house flies, four days old, are enclosed in each cylinder. Their mortality is determined after 1, 2, 3, and 24 hours. The results are tabulated in Table 2.

Table 2

| No. | Mortality of house flies, percent after— | | |
|---|---|---|---|
| | One hour | Two hours | Three hours |
| I | 60 | 88 | 100 |
| III | 25 | 48 | 55 |
| IV | 0 | 0 | 0 |
| V | 0 | 0 | 0 |

The superiority of Compound I of the invention over the position isomer III is evident. Compounds IV and V have no recognizable insecticidal effect. The test is repeated with different amounts of active agents in aqueous suspensions with the results shown in Table 3.

Table 3

| No. | Amount of active agent, mg. per 100 cm.² | Mortality of house flies, percent, after— | | | |
|---|---|---|---|---|---|
| | | One hour | 2 hours | 3 hours | 24 hours |
| I | 0.4 | 74 | 100 | 100 | |
| | 0.2 | 39 | 83 | 100 | |
| | 0.08 | 30 | 65 | 75 | |
| | 0.06 | | | | 100 |
| | 0.04 | | | | 58 |
| | 0.02 | | | | 20 |
| III | 0.4 | 10 | 38 | 48 | |
| | 0.2 | 0 | 10 | 29 | |
| | 0.08 | 0 | 0 | 10 | |
| VI | 0.6 | | | | 66 |
| | 0.4 | | | | 48 |
| | 0.2 | | | | 0 |

In spite of the lower efficiency of the aqueous suspensions in comparison with emulsions the superiority of Compound I over Compounds III and VI is evident, too, as may be seen from Table 3.

EXAMPLE II

*Drosophila melanogaster* Meigen—Fruit fly, pomace fly

Aqueous suspensions of the compounds tested are applied to Petri dishes in different amounts. After drying of the liquid, 30 fruit flies are enclosed under each dish, and their mortality is determined after 24 hours.

Table 4

| Compound No. | Amount of active agent, mg. per 100 cm.² | Mortality of fruit flies, percent, after 24 hours |
|---|---|---|
| I | 0.02 | 100 |
| | 0.04 | 100 |
| | 0.06 | 100 |
| VI | 0.02 | 14 |
| | 0.4 | 33 |
| | 0.6 | 60 |

EXAMPLE III

*Sitophilus granarius* L.—Granary weevil

The compounds are applied to Petri dishes in amounts corresponding to 0.1 mg. per 100 cm.$^2$. After drying of the liquid coatings, 100 bugs are kept under the treated dishes in a dark room.

*Table 5*

| Compound No. | Mortality of weevils, percent after twenty hours |
|---|---|
| I | 100 |
| II | 35 |
| III | 0 |
| IV | 0 |
| V | 0 |
| VI | 0 |

EXAMPLE IV

*Blattella germanica, Periplaneta americana, Leucophaea madeira*—Roaches

Aqueous suspensions of the compounds tested are applied to glass plates in amounts of 0.24 mg. per 100 cm.$^2$. The roaches are placed on the plates and contained by inverted glass beakers. The roaches immobilized after 24 hours are counted.

*Table 6*

| Compound No. | Effectiveness after 24 hours, percent of roaches immobilized | | |
|---|---|---|---|
| | Blattella germanica (adults) | Periplaneta americana (larvae) | Leucophaea madeira (larvae) |
| I | 72 | 80 | 100 |
| III | 16 | 47 | 50 |
| IV | 0 | 53 | 30 |
| VI | 33 | 58 | 80 |

EXAMPLE V

*Dixippus morosus* Brunner—Walking stick

To determine the effect of the tested compounds by contact and by ingestion, aqueous suspensions and emulsions are employed. Young shoots of Tradescantia sp. are sprayed with the aqueous liquids to deposit the active agents at a rate of 0.2 mg. per 100 cm.$^2$. Larvae of *Dixippus morosus* are dipped in aqueous suspensions or emulsions of the agents containing 1000 parts per million of active material, drained, and placed on the treated leaves. Those larvae which do not react to stimuli are counted.

*Table 7*

| Compound No. | Formulation | Percent effectiveness after— | | |
|---|---|---|---|---|
| | | One day | Two days | Three days |
| I | Suspension | 18 | 35 | 47 |
| I | Emulsion | 67 | 89 | 100 |
| II | do | 49 | 54 | 93 |
| III | Suspension | 0 | 0 | 0 |
| III | Emulsion | 0 | 0 | 13 |
| IV | Suspension | 0 | 0 | 0 |
| IV | Emulsion | 0 | 0 | 0 |
| V | do | 0 | 0 | 0 |
| VI | Suspension | 13 | 20 | 34 |

EXAMPLE VI

*Porthetria dispar* L.—Gypsy moth

The tests performed are analogous to those of Example V, but oak shoots are used as host plants instead of tradescantia and larvae were sprayed instead of dipped.

*Table 8*

| Compound No. | Formulation | Percent effectiveness after— | | |
|---|---|---|---|---|
| | | One day | Two days | Three days |
| I | Suspension | 40 | 76 | 90 |
| I | Emulsion | 47 | 80 | 100 |
| III | Suspension | 0 | 0 | 0 |
| III | Emulsion | 0 | 0 | 0 |
| IV | Suspension | 0 | 0 | 0 |
| IV | Emulsion | 0 | 20 | 34 |
| V | do | 0 | 0 | 0 |
| VI | Suspension | 45 | 67 | 80 |

Solid compositions containing 5% of Compound No. 1 also are applied to the moth larvae to determine the contact effect on larvae feeding on untreated leaves, and to the leaves of the young oak shoots to determine the stomach poison effect on untreated larvae.

*Table 9*

| Active agent, kg. per hectare | | Percent effectiveness after— | | |
|---|---|---|---|---|
| | | One day | Two days | Three days |
| 0.75 | Treated larvae | 61 | 78 | 83 |
| 1.5 | do | 72 | 95 | 100 |
| 0.75 | do | 72 | 100 | 100 |
| 1.5 | do | 83 | 100 | 100 |

EXAMPLE VII

*Aphis fabae* Scop.—Aphids

Bean plants (*Vicia faba* L.) carrying approximately one hundred aphides each are sprayed with 50 to 60 milliliters of an aqueous emulsion containing 50 or 100 p.p.m. of active agents. A commercial insecticide (A) of the phosphoric acid ester type is employed as a comparison sample.

*Table 10*

| Compound No. | Concentration of Active agent, p.p.m. | Mortality of aphids, percent after 24 hours |
|---|---|---|
| I | 50 | 92 |
| I | 100 | 100 |
| A | 50 | 78 |
| A | 100 | 100 |
| Untreated | | 2 |

EXAMPLE VIII

*Tetranychus urticae* Koch—Spider mite

Bean plants (*Phaseolus vulgaris* L.) are infested with spider mites of the species *Tetranychus urticae* and sprayed with aqueous suspensions and emulsions of pesticides containing 0.1% of the compounds tested.

*Table 11*

| Compound No. | Formulation | Effectiveness on mites after 6 days | | | |
|---|---|---|---|---|---|
| | | Adults | Nymphae | Larvae | Eggs |
| I | Suspension | 90 | 100 | 100 | 80 |
| I | Emulsion | 100 | 100 | 100 | 90 |
| II | Suspension | 100 | 100 | 100 | 60 |
| II | Emulsion | 100 | 100 | 100 | 80 |

EXAMPLE IX

*Hoplocampa flava* L.—Plum sawfly

Aqueous sprays—containing the compounds tested are applied in the field to five plum trees per test on May 16.

Six liters of spraying solution are employed for each tree. On May 28, 1000 plums are gathered from each group of trees and examined for damage by the plum sawflies which are present in large numbers at the start of the test. A commercially successful insecticide of the carbamate type VI, and another one of the phosphoric acid ester type A are employed for the purpose of comparison.

*Table 12*

| Compound | Active agent, kg. per 100 liters | Damaged fruit, Percent |
|---|---|---|
| I | 0.02 | 4.0 |
|  | 0.03 | 3.2 |
|  | 0.04 | 1.5 |
| A [1] | 0.03 | 7.5 |
| VI | 0.075 | 6.3 |
| Untreated |  | 59.3 |

[1] A=O,O,O′-O′-tetraethyl-S,S′-methylene-bis-phosphoro-dithioate.

EXAMPLE X

*Leptinotarsa decemlineata* Say—Colorado potato beetle

Aqueous emulsions and suspensions of the compounds tested are applied to plots of strongly infested potato fields in amounts of 600 liters per hectare. For the purpose of comparison, commercial insecticides of the carbamate type (Com. VI) and of the chlorinated hydrocarbon type B=a mixture of p,p′-dichloro-diphenyl - $\beta,\beta,\beta$ - trichloro-ethane and the $\gamma$-isomer of hexachlorocyclohexane and 1,2,3,4,10,10 - hexachloro - 6,7 - epoxy - 1,4,4a,5,6,7,8,8a-octahydro - [1,4,5,8-bis-(endo-exo-)methylene] - naphthalene were tested in the same manner.

*Table 13*

| Compound | Active agent, kg. per hectare | Percent of beetle larvae and adult beetles killed after— | |
|---|---|---|---|
|  |  | One day | Four days |
| I | 0.12 | 80 | 96 |
|  | 0.24 | 95 | 100 |
|  | 0.36 | 100 | 100 |
| B | 0.48 | 67 | 98 |
| VI | 0.4 | 88 | 96 |
|  | 0.6 | 97 | 100 |
| Untreated |  | 2 | 4 |

EXAMPLE XI

Aphids

Aqueous emulsions of Compound No. I are sprayed in greenhouse and field tests of plants naturally infested with aphids. The percentage of aphids destroyed is determined after 24 hours.

*Table 14*

| Aphid | Host plant | Percentage of— | |
|---|---|---|---|
|  |  | Active Agent | Effect |
| *Aphis fabae* Scop | *Aristolochia sp* | 0.01 | 100 |
|  | *Vicia faba* | 0.01 | 100 |
| *Aphis farinosa* Gmel | *Salix fragilis* | 0.02 | 100 |
| *Aphis hedera* Kalt | *Hedera helix* | 0.01 | 100 |
| *Aphis pomi* DeG | *Malus silvestris* | 0.04 | 80 |
| *Aphis viburni* Scop | *Viburnum opulus* | 0.02 | 100 |
| *Aphis rumicis* L | *Rumex crispus* | 0.01 | 100 |
| *Aphis urticata* F | *Urtica dioica* | 0.01 | 100 |
| *Brachycaudus helichrysi* Kalt | *Prunus domestica* | 0.04 | 85 |
| *Hyalopterus arundis* F | *Prunus insititia* | 0.04 | 90 |
| *Macrosiphon rosae* L | *Rosa multiflora* | 0.02 | 100 |
| *Myzus cerasi* F | *Prunus cerasus* | 0.02 | 100 |

EXAMPLE XII

*Trialeurodes vaporariorum* Westw.—Whitefly

*Table 15*

| Compound | Concentration of active agent, p.p.m. | Mortality of flies, percent after | |
|---|---|---|---|
|  |  | Two hours | 24 hours |
| I | 400 | 100 | 100 |
|  | 300 | 100 | 100 |
|  | 200 | 100 | 100 |
|  | 100 | 70 | 100 |
| IX | 400 | 100 | 100 |
|  | 300 | 40 | 100 |
|  | 200 | 0 | 95 |
|  | 100 | 0 | 82 |

Tests made as in Example VII by spraying young cotton plants with aq. emulsions of tested compounds. A commercial insecticide (IX) of the phosphoric acid type is used for the control samples.

EXAMPLE XIII

In a fifth series of field tests, Compound No. 1 was evaluated for effectiveness against adults of house flies (*Musca domestica* L.) and northern house mosquitoes (*Culex pipiens* L.). A room of about 30 m.$^3$, artificially infested with 3–6 days old house flies and mosquitoes of different age, was treated with the candidate insecticide formulated as an aerosol containing 2% by weight of toxicant. The application rate corresponds to that recommended for commercial aerosols. Only eight minutes after treatment the first flies and mosquitoes could be observed on the floor. Within 30 minutes after application effectiveness increased to about 75% reaching 90% within the next 20 minutes. In less than 3 hours after treatment a 100% knock down effect was established. Recovery did not occur during the following two days.

The following examples show the high potency of mixtures of the novel compounds of the invention with other pesticidal agents. The activity of the mixtures is seen to be higher than that of the components and indicates synergistic effects. The following known compounds are tested together with Compounds Nos. I and II:

*Table 16*

| No. | Compound |
|---|---|
| VII | O,O-dimethyl-S-(N-methylcarbamoylmethyl)-dithiophosphate |
| VIII | O,O-dimethyl-S-(1,2-dicarbethoxyethyl)-dithiophosphate |
| IX | O,O-diethyl-O-(2-isopropyl-4-methylpyrimidyl-phosphonate |
| X | O,O-dimethyl-O-(p-nitrophenyl)-thionophosphate |
| XI | O,O-dimethyl-O-(1-hydroxy-2,2,2-trichlorethyl-phosphonate |
| XII | 1-naphthyl-N-methylcarbamate |
| XIII | 1,2,3,4,10,10-hexachloro-1,4,4a,5,8,8a-hexahydro-1,4-endo-exo-5,8-dimethano-naphthalene (Aldrin) |
| XIV | 1,2,3,4,10,10-hexachloro-6,7-epoxy-1,4,4a, 5,6,7,8,8a-octa-hydro-1,4-endo, exo-5,8-dimethanonaphthalene (Dieldrin) |
| XV | 1,1,1-trichloro-2-2-bis-(p-chlorophenyl) ethane (DDT) |

EXAMPLE XIV

*Sitophilus granarius*—Granary weevil

The tests are performed in the same manner as in Example III.

Table 17

| Compound No. | Amount of active agents, micrograms per 100 cm.² | Mortality of weevils, percent, after 24 hours |
|---|---|---|
| I | 8 | 7 |
| I | 16 | 18 |
| VII | 20 | 5 |
| VIII | 5 | 21 |
| IX | 80 | 0 |
| IX | 60 | 0 |
| X | 0.8 | 11 |
| XI | 50 | 0 |
| XI | 100 | 0 |
| I+VII | 16+20 | 62 |
| I+VIII | 16+5 | 61 |
| I+IX | 16+80 | 51 |
| I+IX | 20+160 | 60 |
| I+X | 8+0.8 | 47 |
| I+XI | 16+50 | 43 |
| I+XI | 16+100 | 59 |
| I | 16 | 18 |
| XII | 1,600 | 11 |
| I+XII | 16+160 | 67 |
| I+XII | 16+400 | 100 |

AFTER 20 HOURS

| | | |
|---|---|---|
| I | 8 | 6 |
| I | 16 | 18 |
| XIII | 8 | 0 |
| XIII | 12 | 8 |
| XIII | 16 | 47 |
| XIV | 4 | 23 |
| XIV | 8 | 50 |
| XV | 8 | 0 |
| XV | 40 | 8 |
| XV | 80 | 33 |
| I+XIII | 8+8 | 71 |
| I+XIII | 8+16 | 94 |
| I+XIV | 8+4 | 57 |
| I+XV | 8+8 | 63 |
| I+XV | 8+40 | 8 |
| I+XV | 8+80 | 100 |

EXAMPLE XV

*Musca domestica*—Common housefly

The following tests are performed in the same manner as in Example I.

Table 18

| Compound No. | Amount of Active agents, micrograms per 100 cm.² | Mortality of flies, percent after 20 hours |
|---|---|---|
| I | 16 | 8 |
| VII | 8 | 23 |
| I+VII | 16+8 | 85 |

AFTER FOUR HOURS

| | | |
|---|---|---|
| I | 8 | 25 |
| XIII | 8 | 24 |
| XIV | 8 | 22 |
| XV | 8 | 0 |
| XV | 40 | 44 |
| I+XIII | 8+8 | 100 |
| I+XIII | 8+16 | 100 |
| I+XIV | 8+8 | 100 |
| I+XV | 8+8 | 100 |
| I+XV | 8+40 | 100 |

EXAMPLE XVI

*Dixippus morosus* Brunner—Walking stick

The contact effect is evaluated by briefly dipping larvae of *Dixippus morosus* in aqueous suspensions of the active agents.

Table 19

| Compound | Concentration of active agents, p.p.m. | Percent effectiveness after five days |
|---|---|---|
| I | 200 | 30 |
| XII | 500 | 23 |
| I+XII | 200+500 | 78 |

The novel pesticidal compounds of the invention, which are 3-methyl-5-isopropylphenyl esters of N-methylcarbamic acid and of N-dimethylcarbamic acid are highly effective against insects and mites. The compounds of the invention when jointly applied in mixtures with other pesticides which may be known themselves, give compositions having a higher pesticidal potency than that of the components of the mixture.

Obviously, many modifications and variations of the present invention are possible in the light of the above teachings. However, it is therefore to be understood that the invention may be practiced within the scope of the appended claims otherwise than as specifically described.

EXAMPLE XVII

Into a stirred solution of 243 g. (2.45 mol=175 ml.) phosgene in 500 ml. toluene was added drop by drop and at a reaction temperature below 15° C. a solution of 300 g. 3-methyl-5-isopropyl-phenyl and 242 g. (2 mol) dimethylaniline in 500 ml. toluene. Thereafter the mixture was stirred further for 30 minutes at a temperature of about 10° C., then for one hour at a temperature of about 50° C. Subsequently the mixture was cooled, whereupon the precipitated dimethylanilinhydrochloride was separated by suction. The toluene-filtrate, after drying over sodiumsulfate, was distilled under diminuated pressure. The 3-methyl-5-isopropylphenyl ester of chloroformic acid (383 g.) boils at B.P. $_{0.002}$=53° C.

Into a stirred solution of 10.65 g. (0.05 mol) of this chloroformic acid ester in 25 ml. toluene there was added drop by drop and a temperature of 5–8° C. a solution of 4.65 g. (0.15 mol=3.5 ml.) methylamine in 25 ml. toluene and thereafter stirred further for about 15 minutes. Then the reaction mixture was diluted with ether. The ether solution was washed with water. After drying over sodium-sulfate and filtering the ether solution was concentrated. The residue (10.2 g., M.P. 77–79° C.) was recrystallised and yielded 6.33 g. of 3-methyl-5-isopropylphenylester of N-methylcarbamic acid: M.P. 87–87.5° C. (ligroine).

What we claim is:

1. A pesticidal composition containing as an insecticidal and acaricidal agent a compound of the formula

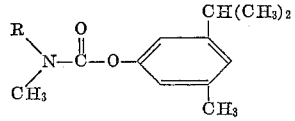

wherein R is selected from the group of radicals consisting of hydrogen and methyl, and an inert carrier.

2. A pesticidal composition containing the 3-methyl-5-isopropylphenyl ester of N-monomethylcarbamic acid as an insecticidal and acaricidal agent, and a carrier.

3. A pesticidal composition containing a plurality of pesticidal agents, at least one of said agents being a compound of the formula

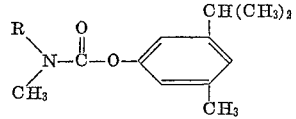

wherein R is selected from the group consisting of hydrogen and methyl.

4. A pesticidal composition containing a plurality of active agents selected from the group consisting of insecticides and acaricides, at least one of said agents being a compound of the formula

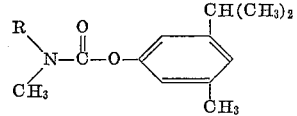

wherein R is selected from the group consisting of hydrogen and methyl.

5. A pesticidal composition as set forth in claim 3, wherein another one of said agents is a member of the group consisting of O,O-dimethyl-S-(N-methylcarbamoylmethyl) - dithiophosphate, O,O - dimethyl-S-(1,2-dicarbethoxyethyl) - dithiophosphate, O,O - diethyl-O-(2-isopropyl - 4 - methylpyrimidyl-6)-dithiophosphate, O,O-dimethyl-O-(p-nitrophenyl)-thionophosphate and O,O-dimethyl-O-(1-hydroxy-2,2,2-trichlorethyl)-phosphonate.

6. A pesticidal composition as set forth in claim 3, wherein another one of said agents is a chlorinated hydrocarbon selected from the group consisting of 1-naphthyl-N-methylcarbamate, 1,2,3,4,10 - hexachloro-1,4,4a, 5,8,8a-hexahydro-1,4,endo, exo-5,8-dimethano - naphthalene, 1,2,3,4,10,10 - hexachloro-6,7-epoxy-1,4,4a,5,6,7,8, 8a - octa-hydro-1,4-endo, exo-5,8-dimethanonaphthalene and 1,1,1-trichloro-2-bis-(p-chlorophenyl) ethane.

7. A pesticidal composition as set forth in claim 3, wherein another one of said agents is 1-naphthyl-N-methyl carbamate.

8. The 3-methyl-5-isopropylphenyl ester of N-methylcarbamic acid.

9. The 3-methyl-5-isopropylphenyl ester of N-dimethylcarbamic acid.

10. In a method of protecting an object from pests, the step of applying to said object a pesticidal amount of a compound of the formula

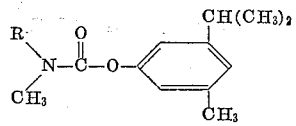

wherein R is selected from the group of radicals consisting of hydrogen and methyl.

11. In a method of protecting an object from pests, the step of applying to said object a pesticidal amount of composition containing a plurality of active agents, at least one of said agents being a compound of the formula

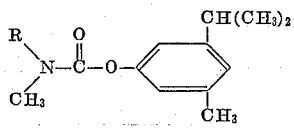

wherein R is selected from the group of radicals consisting of hydrogen and methyl.

12. In a method of protecting an object from pests, the step of simultaneously applying to said object a plurality of active pesticidal agents, at least one of said agents being a compound of the formula

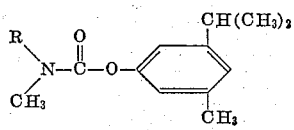

wherein R is selected from the group of radicals consisting of hydrogen and methyl, said active agents being applied in a pesticidal amount.

References Cited by the Examiner

UNITED STATES PATENTS 2,955,069   10/60   Jones et al. _____ 167—30

FOREIGN PATENTS 523,872   11/53   Belgium.
852,920   11/60   Great Britain.
964,818   5/57   Germany.

OTHER REFERENCES

Kolbezen et al.: Journal of Agricultural and Food Chemistry, vol. 2, No. 17, pages 864 to 870, Aug. 18 1954.

JULIAN S. LEVITT, *Primary Examiner.*

M. O. WOLK, LEWIS GOTTS, *Examiners.*